(12) United States Patent
Dennert

(10) Patent No.: US 8,775,592 B2
(45) Date of Patent: Jul. 8, 2014

(54) METHOD FOR TRANSMITTING AND NEGOTIATING NETWORK-CONTROLLED FUNCTIONAL DATA BETWEEN A CLIENT AND A SERVER

(75) Inventor: Thomas Dennert, Troisdorf (DE)

(73) Assignee: Deutsche Telekom AG, Bonn (DE)

( * ) Notice: Subject to any disclaimer, the term of this patent is extended or adjusted under 35 U.S.C. 154(b) by 749 days.

(21) Appl. No.: 13/061,840

(22) PCT Filed: Aug. 28, 2009

(86) PCT No.: PCT/EP2009/006245
§ 371 (c)(1),
(2), (4) Date: Apr. 5, 2011

(87) PCT Pub. No.: WO2010/025875
PCT Pub. Date: Mar. 11, 2010

(65) Prior Publication Data
US 2011/0191623 A1    Aug. 4, 2011

(30) Foreign Application Priority Data
Sep. 8, 2008 (DE) .......................... 10 2008 046 058

(51) Int. Cl.
*G06F 15/173* (2006.01)

(52) U.S. Cl.
USPC ...................................................... 709/223

(58) Field of Classification Search
CPC .......................... H04M 1/274516; H04M 1/56
USPC ...................................................... 709/223
See application file for complete search history.

(56) References Cited

U.S. PATENT DOCUMENTS

| 5,119,415 | A | * | 6/1992 | Aoyama | 379/230 |
|---|---|---|---|---|---|
| 5,583,933 | A | * | 12/1996 | Mark | 379/357.04 |
| 5,732,133 | A | * | 3/1998 | Mark | 379/357.03 |
| 5,745,555 | A | * | 4/1998 | Mark | 379/93.03 |
| 5,818,930 | A | * | 10/1998 | Mark | 379/444 |
| 5,825,871 | A | * | 10/1998 | Mark | 379/357.03 |
| 6,321,199 | B1 | * | 11/2001 | Theimer et al. | 704/275 |
| 7,127,488 | B1 | * | 10/2006 | Scott et al. | 709/204 |
| 7,194,256 | B2 | * | 3/2007 | Lee | 455/418 |
| 7,590,722 | B2 | * | 9/2009 | Ferguson et al. | 709/223 |
| 7,685,530 | B2 | * | 3/2010 | Sherrard et al. | 715/764 |
| 7,747,687 | B2 | * | 6/2010 | Kurata et al. | 709/204 |
| 7,813,714 | B2 | * | 10/2010 | Laursen et al. | 455/405 |
| 7,849,205 | B2 | * | 12/2010 | Pounds et al. | 709/230 |
| 8,135,391 | B2 | * | 3/2012 | Scott et al. | 455/415 |
| 8,527,773 | B1 | * | 9/2013 | Metzger | 713/176 |
| 8,577,351 | B2 | * | 11/2013 | Scott et al. | 455/415 |
| 8,589,817 | B2 | * | 11/2013 | Fukimoto et al. | 715/780 |
| 8,594,288 | B2 | * | 11/2013 | Robbins et al. | 379/142.06 |
| 8,606,262 | B1 | * | 12/2013 | Ross et al. | 455/425 |
| 8,626,855 | B2 | * | 1/2014 | Pounds et al. | 709/206 |
| 2006/0190525 | A1 | * | 8/2006 | Bobde et al. | 709/202 |
| 2008/0102819 | A1 | * | 5/2008 | Bengtsson et al. | 455/425 |
| 2009/0285129 | A1 | * | 11/2009 | Swanburg et al. | 370/259 |
| 2011/0238811 | A1 | * | 9/2011 | Hawkins | 709/223 |

* cited by examiner

*Primary Examiner* — Rupal Dharia
*Assistant Examiner* — Marcus McKenzie
(74) *Attorney, Agent, or Firm* — Andrew Wilford

(57) ABSTRACT

The invention relates to a method for transmitting control data in a telecommunication network for controlling a service administered by the telecommunication network, especially a server connected to the telecommunication network. According to said method, the telecommunication network provides a data object, especially a contact of an address book, with a function that is special with respect to other data objects. A parameterized message is transmitted by the terminal device for telecommunication via the telecommunication network to a higher order system component of the telecommunication network, said message comprising at least one first parameter for characterizing the data object and a second parameter containing a control information, especially for the activation, deactivation or modification of the service. The higher order system component checks at least one of the parameters and the service is controlled depending on the result of the check and in accordance with the control parameter.

17 Claims, No Drawings

METHOD FOR TRANSMITTING AND NEGOTIATING NETWORK-CONTROLLED FUNCTIONAL DATA BETWEEN A CLIENT AND A SERVER

CROSS REFERENCE TO RELATED APPLICATIONS

This application is the US national stage of PCT application PCT/EP2009/006245, filed 28 Aug. 2009, published 11 Mar. 2010 as WO2010/025875, and claiming the priority of German patent application 102008046058.3 itself filed 8 Sep. 2008, whose entire disclosures are herewith incorporated by reference.

The invention relates to a method of transmitting control data within a telecommunications network to control a service that is administered by the telecommunications network, in particular, a server connected to the telecommunications network, in which method the telecommunications network supplies a special function to a specific data object relative to other data objects, in particular, to a contact of an address book, wherein a parameterized message is transmitted by a terminal device for telecommunication through the telecommunications network to a higher-order system component of the telecommunications network, the message including at least a first parameter to identify the data object and a second parameter with control information, in particular to activate, deactivate, or is modify the service.

The ability to offer special functions for individual data objects within a telecommunications network is well known. The data object can involve a contact of an address book, i.e., a telecommunications subscriber who is identifiable, for example, by a call number and/or a name. Multiple parameters here form a parameter set. In principle, a single parameter is sufficient to uniquely identify the data object of the type "contact", for example, a call number of a contact. One specific such contact, or even multiple such contacts that together form a group, can be negotiated, for which the telecommunications network operated by the telecommunications provider provides special functions. These special functions can be, for example, an especially favorable call rate for calls to this contact, the display of status information about this contact, e.g., as to whether the contact is temporarily unavailable or is at that moment is located within the same or an adjacent mobile communications cell, i.e., within the immediate vicinity.

The document U.S. 2007/0035513 [U.S. Pat. No. 7,685, 530] discloses an approach whereby a group of contacts is created that represents preferred friends, also termed favorites or "faves" for short. These contacts are coordinated with a mobile network operator, in particular, with a server of the mobile cellular network, and shown in human-centric fashion on the display of the cellular telephone, which constitutes a client, by means of an icon or a photo of the contact person. Whenever a cellular telephone is being used, a standard screen including preferred friends appears on the display who can be individually selected and for whom a call connection can be established by pressing a button on the accept-call button of the cellular telephone. The favorites thus constitute data objects for which the mobile cellular network provides special functions.

In order to control this type of service, special parameters and corresponding parameter values, which other contacts stored in the address book of the cellular telephone do not require, must be associated with the data objects. These parameters contain information, e.g., on the maximum number of favorites within a group, an identity number for the contact within the group, the position of the visual representation of the contact on the display of the mobile terminal device, the availability status of the contact, or information on whether the telecommunications network subscriber is located in the immediate vicinity. In addition, the call number of the preferred contact, or other information that uniquely identifies the contact, must be known to the telecommunications network in order to allow the telecommunications provider to offer a special low charge rate for the favorites. Coordinating the favorites with the telecommunications provider is effected by entering the requisite data in the mobile terminal device and then transmitting this to a server of the mobile cellular network. Specialized software is provided on the mobile terminal device for this purpose.

Entering the information required to control the service, in particular, the control parameters on the mobile terminal device to be associated with a data object, is subject to errors. For example, certain information is required to correctly set up the service, information that is only known to the telecommunications provider, such as, for example, the maximum number of data objects for which the special function is available. If the user of the terminal device selects an additional data object such that the maximum number of data objects is exceeded for which the service is available, this constitutes an incorrect entry. In addition, a situation can arise whereby the user of the terminal device selects a data object to utilize a special function for which this service is not available, for example, when the data object selected is of the type: emergency call number or a call number with a foreign area code. Finally, what can also occur is that values are used for the parameters that cannot be interpreted, i.e., understood by the server managing the service. Erroneous parameter values can cause the service for a data object not to function correctly, or even cause the service to be interrupted such that it is no longer available to another terminal device of the telecommunications network.

The object of this invention is therefore to provide intelligent, error-tolerant system management or network management of a service in a strictly hierarchical client-server environment that provides special functions to one or more data objects relative to other equivalent data objects, wherein errors can be detected and entry-error-caused disruptions of the service can be prevented during the transmission and negotiation of the data object, or data objects, between a communications terminal device (client) and the server of the telecommunications network administering the service.

This object is achieved by the features of claim 1. Additional features and advantageous developments of the invention are referenced in the subordinate claims.

The invention proposes a method for transmitting control data within a telecommunications network to control a service that is administered by the telecommunications network, in particular, by a server connected to the telecommunications network, in which method the telecommunications network provides a special function to a specific data object, in particular, to a contact of an address book, relative to other data objects, in particular, address book contacts, wherein a parameterized message is transmitted by a terminal device for telecommunication through the telecommunications network to a higher-order system component of the telecommunications network, the message comprising at least a first parameter to identify the data object and a second parameter including control information, in particular, for activating, deactivating, or modifying the service, and wherein the higher-order system component checks the at least one parameter and controls the service as a function of the result of the check in accordance with the control parameters.

A higher-order system component is a central component of the telecommunications network that executes a function, in particular, checking and/or interpreting parameters, for a plurality of terminal devices (clients) of the telecommunications network. The higher-order system component is part of the management level of the telecommunications network, also called the system level or administrative level. A parameterized message relates to an electronic notification of a network component, i.e., higher-order system component or terminal device. The messages have two essential functions. The function first of all to transport and store information, e.g., address book contacts, and, secondly, they are carriers of control data for the administrative levels of the system, e.g., of the telecommunications network. The control parameters here are understood to refer to an instruction set of an interpreting, information-processing system. Along with the transmission of the message, a parameter is simultaneously transmitted that describes a contact, i.e., a person (user data level) as well as a parameter for controlling the network (management level).

The fundamental idea of this invention is the checking of at least one parameter transmitted with the message in a higher-order system component of "higher intelligence."

In a first advantageous embodiment of the invention, the parameter(s) can be checked for plausibility. For example, a check can be made as to whether the first parameter matching a call number in accordance with an international standard, whether, for example, the E.164 standard in the form 00492211234567, i.e., for example, including the country code and/or the network code and without spaces, is contained in the parameter. This type of plausibility check does not necessarily have to be a check for errors since a call number without network code is also correct, i.e., for example, in the form 01711234567.

In particular, a check of the parameter or parameters can be effected as part of the plausibility check. This type of error check can examine, for example, whether the call number consists only of numerals, whether the prefixed "0" is in incorrectly provided in the network code when using a country code such as 0049, or whether the country code correctly starts with a double zero or a "+" sign.

In addition and/or alternatively, the plausibility check can examine whether the control information of the second parameter matches an instruction that the server responsible for administering the service understands.

When an error is detected, preferably error correction can be effected. If, for example, a space has been detected in the call number, this can be deleted; if a preceding zero in the network code and country code has been used, this zero can be deleted; if a zero is missing from a double zero in the country code, a zero can be added; and/or if a character other than the "+" is found in the country code, this incorrect character can be replaced by a "+" sign.

In an advantageous development of the invention, automatic completion of a parameter can be performed. If a country code is missing, for example, this can be added and the corresponding zero in the network code can be removed.

In addition, provision can be made whereby the parameter (s) is/are checked for service conformity. As part of this check, it can be determined, for example, whether a request transmitted with the message can be granted in terms of activating, deactivating, or modifying a given data object. When checking the service conformity, a variety of checks can be performed on at least one of the parameters, as explained below by way of example.

In an advantageous development of the invention, the message can be examined for completeness of the parameter. For example, the check can determine whether both the first and also the second parameters are contained in the message, or whether corresponding parameters are set, i.e., whether both the parameter identifying the data object as well as the parameter containing the control information are provided. In addition, the check can determine whether other parameters aside from the first and second parameters are provided. If this is not the case, the or these specific other parameter(s) can be added automatically by the network—for example, a parameter indicating the availability of a contact.

In addition, provision can be made according to the invention whereby the message contains multiple parameters and automatically completes empty parameters of the parameter sets. The user of the terminal device thus does not have to assign the appropriate values to all available parameters. For example, a parameter can indicate a reference number for the data object, the number uniquely identifying the data object within the group of data objects for which the special function has been provided. In a simple case, the reference number can be a number that is incremented for a data object which is to be added to the group. While the automatic completion of parameters is being effected, the network can check how many data objects the special function has already been provided for, with the result that based on this number the parameter identifying the new data object by a reference number is automatically assigned a value that corresponds to a number incremented by one. Alternatively, another reference number can also be associated automatically by the network with the parameter.

The above-mentioned checks and/or error corrections can be based on artificial intelligence, thereby implementing a reliable, intelligent and error-tolerant management system for managing the service providing the special function. The checks according to the invention here are preferably effected by the higher-order system components, although it is also possible for some of the referenced checks and/or corrections to be performed by the server administering the service. It should be noted that the server can be an independent entity or integral part of the higher-order system component. In a simple alternative embodiment, the server can constitute the higher-order component.

The method according to the invention enables virtually any desired number of simple client systems, i.e., terminal devices to be supplied using a low level of computational resources in regard to capacity and power, and at a high level of complexity in terms of data analysis and error tolerance. This performance capability is provided externally—specifically by the higher-order system component.

A modification of the checked, and sometimes interpreted, message is effected by the error correction and/or completion of a parameter without any intervention by the terminal device. As a result, many client systems can generate messages and transmit these to the higher-order system level for the purpose of checking the data sets and parameterization, as well as controlling the management level. These messages are transmitted back to the client system, i.e., the terminal device after being either confirmed or modified. What this method also achieves is that error detection is possible simultaneously both in a low communication layer (echo method) and in a high application layer (error-tolerant, system-specific and service-specific checking). The method also allows for user support by providing error-tolerant entry capability using autocorrect or wild cards. Integrating human intelligence can also be implemented virtually in real time by involving a system administrator in the communications processes. The form of implementing the higher-order system components here is transparent to the user. He/she receives the same information irrespective of the form of the checking or processing in the system.

Using a simple message transmission, the method is able to achieve five fundamental goals:

1. the transmission of user data, for example, contact information such as address information, from the terminal device to a higher-order system level;
2. the transmission of control information from the terminal device to a higher-order system level, for example, the activation, deactivation, or modification of a service;
3. capabilities allowing a central system component to also perform a complex and computationally intensive checking of the information from many different terminal devices (client systems) for, e.g., plausibility and service conformity;
4. confirmation or updating of the client message by a message transmitted back to the client system by the central system component, followed up an update within the client system; and
5. error detection that can be effected, for example, by an echo method.

The transmission of the message from the terminal device to the higher-order system component and/or the return transmission of a confirmation message or modified message to the terminal device can be effected by means of an intelligent synchronization of databases—in the case of data objects of the type "contacts," for example, from an address book maintained in the terminal device and from an network address book, as described in the international patent application PCT/EP2008/007836, the content of which is explicitly hereby incorporated by reference.

Alternatively, the message transmitted back to the terminal device can be an electronic short message, for example, an SMS, including information about activation, deactivation, or modification of the service.

Another advantage of the method is the very flexible control of accessibility both by means of a user interface on the terminal device, in particular, a graphic user interface, and also by a corresponding interface in the area of the higher-order system level, for example, by means of a web interface for a user, or an administrator interface having various rights. What results is thus any desired number of access points from which the service can be configured, i.e., activated, deactivated, or modified, in particular from the terminal device side or from the network component side, where essentially identical administrative processes are implemented.

In an advantageous development of the invention, a linking of various user messages can be effected by the network. The user messages can thus be linked with information, which may not be accessible at all to the user, and formed into a new message. This message can be transmitted to terminal device and replaces its originally generated information content, i.e., the parameters or parameter values found in the terminal device. For example, a parameter can be transmitted by a message of a first terminal device, which purely by way of example is a cellular telephone, where the parameter contains information about the geographic location of this terminal device—for example, an identifier of the current relevant mobile radio cell. Furthermore, a message from a second terminal device can similarly send a parameter including location information about this second terminal device to the higher-order system component. If the second terminal device is included in a contact of the first terminal device for which the special function has been provided, the location information in the message from the second terminal device can be linked to the corresponding parameter in the message of the first terminal device to form a new message. This can preferably be implemented whenever the second terminal device is located in the immediate vicinity of the first terminal device. The new message is then transmitted to the terminal device that stores and can display the updated information about the location of the second terminal device.

Time-related, spatial, or other boundary conditions can be taken into account in the higher-order system component when checking at least one, preferably all, of the parameter(s) contained in the message transmitted to the higher-order system component. In terms of time, what can be considered, for example, is whether the special function is only available for a specific period of time. In response to activating or modifying the service after this period of time expires, activation can be denied, for example. In terms of space, what can be checked, for example, is whether the first parameter identifiers a contact with call number that is assigned to a domestic or foreign connection point. If the special function is only available to domestic or own-network connection points or telecommunications subscribers, the check results in the activation request being denied. Additional boundary conditions that can be taken into account include, for example, the maximum number of data objects for which the special function is provided.

The capability for activation, deactivation, or modification of the service can be effected accordingly based on specified rules, where the process can take into account for how many data objects the service is already active and whether the number of these data objects exceeds a specified maximum number, when activation has been effected for the new data object, and/or whether a specific period of time has passed since the point in time of the last modification of the data object or of another data object for which the service is already active.

The data object can be, for example, a contact, an appointment, a note, or a task that is stored in a database on the terminal device. A data object is defined by parameters and parameter values assigned to these objects, where at least one additional parameter, which can be used to control the service, is assigned to those data objects for which the service with the special function is active.

If the data object relates to a contact, the data object can be in the form of a business card that can contain all of the information characterizing the contact, such as last name, first name, business phone number, private and/or cell phone number, e-mail address, etc. In this case, the first database constitutes an address book within the terminal device, while the second database constitutes a network-based address book that functions through synchronization as a backup of the first address book. The network-based address book, also called the network address book, can be synched with address books of other terminal devices—for example, other cell phones, PDAs, or computers, thereby ensuring that the address book on each terminal device is always up-to-date.

Whenever the service for a data object is to be activated, deactivated, or modified, the data object can be selected according to the invention from among a plurality of other data objects stored in the first database by assigning a parameter value to a control parameter associated with the data object, which value indicates the association or non-association of the data object with a group of data objects allocated to this special function. If the parameter value of the control parameter indicates that the service is not active for the data object, the data object does not need to have any additional parameters to control the service.

According to the invention, the control parameter can be a status parameter to which the communications terminal device in each case assigns a specific status parameter value whenever the service for the data object is to be activated, deactivated, or modified. For example, the value "assign" can thus be associated with the status parameter whenever the service is to be activated for the data object. Furthermore, for example, the value "withdraw" can be associated with the status parameter whenever the service is to be deactivated for the data object. Finally, the value "modified" can be associated with the status parameter, for example, whenever the service is to be modified for the data object. The status parameter can thus support the needs of the user in terms of modifying the service for a given data object and can easily communicate this to the communication network.

A synchronization protocol is used to synchronize the two databases. Preferably, the standardized SyncML protocol can be used that is defined in standard RFC2426 . This protocol has the advantage that parameters that deviate from the defined standard parameters of the standard can be defined by a term that begins with an "X".

In the event the service is activated for the data object, parameter values can be assigned to multiple control parameters associated with the data object. Thus, for example, a first control parameter can convey the total number of group members for which the service can be enabled. Another parameter can contain an identification number of the data object within the group of preferred data objects. Finally, a control parameter can contain information as to how and/or where the data object is to be shown on a display of the terminal device. An assignment of multiple parameter values to multiple parameters can also be effected in the event of a modification or deactivation of the service. For this last-referenced case, a value of "zero" is associated with the parameters that do not contain any relevant control information for the deactivation.

In the event of a positive check of the data object, the server can preferably activate the service for the data object. The server can then assign to the status parameter a parameter value indicating the active status, for example, "active." Finally, the data object can be stored in the second database together with the new status parameter.

The data object can then be transmitted together with the modified status parameter to the communications terminal device by synchronizing the databases, where the old data object can be replaced by the new data object in the first database. The synchronization can preferably be effected as part of the same synchronization process that was originally initiated by the terminal device. The synchronization connection established between the terminal device and the server for synchronizing the databases can thus remain active during the entire checking process and up until a return transmission of the data object.

In order to inform the user of the terminal device, the server can transmit to the terminal device an electronic short message including information about the successful or unsuccessful activation, deactivation, or modification of the service. An SMS (Short Message Service) or an SMS0 that are immediately shown on the display of the terminal device can be used, in particular, for the electronic short message.

In an advantageous development of the invention, an additional status parameter including the parameter value "pending" can be associated with the contact by the terminal device together with the modification request so as to preclude additional modification requests before completion of the current modification.

According to the invention, provision can furthermore be made whereby a parameter value or parameter values are assigned to the control parameter or control parameters by the server of the telecommunications network, and the data object is stored along with the modified parameter or parameters in the database associated with the server. After storing these, the server can then initiate a synchronization of this database with the database associated with the terminal device to transmit the control data of the control parameters to the terminal device. This thus enables the telecommunications network for its part as well to effect a modification of the service and communicate it to the terminal device, for example, whenever the service is to be kept active only for a specific period of time, and a deactivation is to be effected automatically once this period of time ends.

According to the invention, when the check is negative the server can deactivate the service, assign to the control parameter a parameter value indicating the inactive status, and store the data object in the second database together with the new control parameter value. The data object can then preferably be transmitted together with the modified control parameter to the communications terminal device by synchronizing the second database with the first database, and the original data object can be replaced by the new data object in the first database. The result here is that the original status of the database object is restored, i.e., the modification request is denied.

The action of checking the data object can be effected by a server that is connected to the second database. In this case, the server can handle the central management of the network-based database and the administration of the service. Preferably, however, the service can also be managed by a second server, for example, by the higher-order system component, wherein the first server transmits the data object, or at least the control parameter(s) of the data object, to be checked to the second server that checks the data object specifically in regard to activation of the service.

It must be noted that this invention is not restricted to the preferred embodiments described above. In fact, other checks of the parameters for plausibility and/or service conformity, and automatic completion of parameters, can also be performed without deviating from the fundamental idea of the invention.

The invention claimed is:

1. A method of transmitting control data within a telecommunications network to control a service that is administered by the telecommunications network by a server connected to the telecommunications network, the method comprising the steps of:
   supplying via the telecommunications network a special function to a specific data object relative to a contact of an address book,
   transmitting a parameterized message by a terminal device for telecommunications through the telecommunications network to a higher-order system component of the telecommunications network,
   including in the message at least a first parameter to identify the data object and a second control parameter with control information, to activate, deactivate, or modify the service,
   checking with the higher-order system component at least one parameter,
   controlling the service as a function of the result of the check in accordance with the control parameter,
   checking the parameter(s) for plausibility;
   checking if the control information of the second parameter corresponds to an order for the server responsible for administering the service,
   checking the parameter(s) for errors, checking whether the control information of the second control parameter matches an instruction that the server responsible for administering the service can understand, and correcting an error when an error has been detected.

2. The method according to claim 1, further comprising the step of:

automatically completing a parameter.

3. The method according to claim 1, further comprising the step of:

checking the parameter(s) for service conformity.

4. The method according to claim 1, further comprising the step of:

checking the message to verify the completeness of the parameters.

5. The method according to claim 1, wherein the message contains multiple parameters, the method further comprising the step of completing empty parameters of the parameter sets.

6. The method according to claim 1, further comprising the step, after receiving and checking the message, of:

transmitting a confirmation message back to the terminal device.

7. The method according to claim 1, further comprising the steps of:

transmitting a corrected message back to the terminal device in the case of an error correction, and/or a completed message is transmitted back to the terminal device in the case of automatic completion.

8. The method according to claim 1, wherein the service can be set up through an interface on the terminal device or through an Internet interface.

9. The method according to claim 1, further comprising the step of:

providing the Internet interface as a personalized Web portal for a user or an administrator having various rights.

10. The method according to claim 1, further comprising the step of:

linking two or more messages to each other to form a new parameterized message.

11. The method according to claim 1, further comprising the step of:

examining time-related, spatial, or fact-related conditions during the check.

12. The method according to claims 10, further comprising the steps of:

transmitting the new parameterized message to the terminal device, and replacing the parameters contained in the message the parameters of the original messages.

13. The method according to claim 1, wherein the second parameter is a status parameter, the method further comprising step of assigning to the status parameter by the terminal device a specific status parameter value whenever the service for the data object is to be activated, deactivated, or modified.

14. The method according to claim 1, further comprising the step of:

checking the message by the higher-order system component as to whether the service can be activated, deactivated, or modified for the data object.

15. The method according to claim 1, further comprising the steps, in the event of a positive check, of:

activating by the higher-order system component the service for the data object and assigning to the status parameter a parameter value indicating the active status.

16. The method according to claim 1, further comprising the steps, in the event of a negative check, of:

deactivating by the system component the service for the data object, assigning a parameter value indicating the inactive status to the control parameter, and transmitting a message with the corrected status parameter back to the terminal device.

17. The method according to claim 1, further comprising the step of:

transmitting by the system component the message or the at least one parameter to be checked to the server that manages the service.

* * * * *